United States Patent [19]

Suen et al.

[11] 4,092,244

[45] * May 30, 1978

[54] CORROSION AND SCALE INHIBITORS FOR INDUSTRIAL RECIRCULATING COOLING WATER SYSTEMS

[75] Inventors: Tzeng Jiueq Suen, New Canaan; Arthur James Begala, Jr., Fairfield, both of Conn.

[73] Assignee: American Cyanamid Company, Stamford, Conn.

[*] Notice: The portion of the term of this patent subsequent to Jan. 18, 1994, has been disclaimed.

[21] Appl. No.: 715,809

[22] Filed: Aug. 19, 1976

Related U.S. Application Data

[62] Division of Ser. No. 595,651, Jul. 14, 1975, Pat. No. 4,003,842.

[51] Int. Cl.$^2$ ............................................. C02B 5/06
[52] U.S. Cl. ................................. 210/58; 21/2.7 A; 252/8.55 E; 252/180; 252/389 A
[58] Field of Search ........................... 210/54, 58, 59; 252/180, 181, 8.55 E, 387, 388, 389 R, 389 A; 21/2.7 R, 2.7 A

[56] References Cited

U.S. PATENT DOCUMENTS

| | | | |
|---|---|---|---|
| 3,293,176 | 12/1966 | White | 210/58 |
| 3,488,289 | 1/1970 | Tate | 210/58 |
| 3,974,083 | 8/1976 | Suen et al. | 210/58 |
| 4,003,842 | 1/1977 | Suen et al. | 210/58 |

*Primary Examiner*—Charles N. Hart
*Assistant Examiner*—Peter A. Hruskoci
*Attorney, Agent, or Firm*—Gordon L. Hart

[57] ABSTRACT

Disclosed is a chemical composition and a process for inhibiting corrosion and scaling on metal surfaces in industrial cooling water systems. The process includes the addition to the cooling water of from 10 to 200 ppm of an alkyl polyethoxy compound having a free carboxylate, sulfonate or phosphonate group. In some preferred embodiments, 10 to 500 ppm of a mineral oil is added to the water system, in addition to the polyethoxy compound.

13 Claims, No Drawings

CORROSION AND SCALE INHIBITORS FOR INDUSTRIAL RECIRCULATING COOLING WATER SYSTEMS

This is a division of application Ser. No. 595,651 filed July 14, 1975 now U.S. Pat. No. 4,003,842.

BACKGROUND OF THE INVENTION

The invention relates to corrosion prevention in water systems. In particular, it relates to the use of a chemical additive in the water of a cooling water system to prevent corrosion and scale deposits on metal surfaces in such a circulating water system.

In present methods of controlling corrosion and scale in water systems, additives, usually in very small proportions, to the circulating water commonly are used. Additives containing metal compounds, particularly chromates, are offered commercially for these purposes. Such metal compounds have the disadvantage of toxicity; and, they pose a water pollution problem if they are discharged into a natural watercourse. While some non-toxic, biodegradable organic additives have been proposed, their inhibiting effects have usually been less than satisfactory. U.S. Pat. No. 2,529,177 proposed the addition of certain hydroxy-polycarboxylic acids such as citric, malic, tartaric and mucic acids, or their soluble salts, to water systems for control of corrosion and tuberculation in water pipes. That patent suggested that hydroxy-polycarboxylic acids would be attracted from the water solution to metal surfaces in the system and would form a protective organic layer on the metal surfaces. Although these additives have the advantages of non-toxicity and biodegradability, they have not been effective for practical control of corrosion and scale, in most instances.

The present invention provides organic compound additives for cooling water in a circulating water system, which are effective as inhibitors of scale and corrosion when added in very small proportions. These additives have the advantage of non-toxicity and biodegradability and are found to be effective for practical control of corrosion and scale in open cooling water systems, under most ordinary operating conditions.

Additives found useful in accordance with the invention belong to a class of organic compounds having a combination of several functional groups in the organic molecule. Each of these groups incorporated in the molecule is necessary or advantageous for the effective corrosion and scale inhibiting function of the additive.

The compound includes an organic sulfonate, an organic phosphonate or an organic carboxylate group, which provides an anchoring functional group in the molecule, by which the molecule is attracted to the metal surfaces in the system. This anchoring effect is similar to that performed by the carboxyl radical in the hydroxy-polycarboxylate additives that were described in U.S. Pat. No. 2,529,177.

The molecule of an additive compound of the present invention additionally includes an oleophilic terminal hydrocarbon chain which, in itself, enhances the inhibiting function of the additive. When used in combination with an oil additive in the circulating water, it functions further to improve the corrosion and scale inhibiting effects. This oleophilic terminal group serves to attract dispersed oil from the circulating water, and binds it in the protective film which is formed by the additive compound on the metallic surfaces of the system. Accordingly, when a minor amount of the additive is dissolved in the circulating water, the additive will be anchored or adsorbed on metal surfaces through the action of the anchoring functional group so as to form an effective protective film on such surfaces. When a minor proportion of an oil or a substituted hydrocarbon also is dispersed into the circulating water, the oleophilic functional group of the additive compound will attract the dispersed hydrocarbon to the protective film to even further enhance the protective function of the film on the metallic surfaces.

The inclusion of a terminal hydrocarbon chain on the molecule as an oleophilic functional group will tend to insolubilize the compound. Since solubility of the compound in water is important for the proper functioning of the additive, the compound developed by this invention further includes a solubilizing functional group in addition to the other functional groups described above.

DESCRIPTION OF THE PREFERRED EMBODIMENTS

In the alkyl polyethoxy molecule of the present invention, the terminal oleophilic group is an alkyl hydrocarbon radical having 8 - 22 carbon atoms. This hydrocarbon group is connected in the molecule to a solubilizing group which is a polyalkoxy chain having from 1 to 6 members. This solubilizing group, in turn, is connected to a metal-attracting terminal group having a cation such as hydrogen or a metal ion, which is capable of ionization in aqueous solutions.

Preferred compounds of the foregoing description are characterized by the generic formula:

wherein:
R is a hydrocarbon radical of 8 - 22 carbon atoms;
R' is —O—,

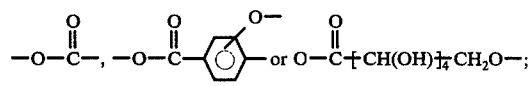

R" is Hydrogen, methyl or Z' — where Z' is COOM, SO$_3$M
or
PO(OM)$_2$ — M being H or an alkali metal;
R''' is H, NH$_2$, OH, methyl, Z' or CH$_2$Z' — where Z' is defined as above;
Z is Z' — as defined above, or NH$_{2-y}$ (CH$_2$Z')$_y$ —
where
$y$ is 1 or 2; and
$m$ is 1 - 6,
$n$ is zero or 1,
$p$ is zero or 1,
$x$ is zero or 1,
$s$ is zero or 1

For the described use as corrosion and scale inhibitors, preferred compounds selected from the class defined above are those characterized by the general formula:

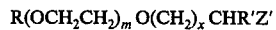

wherein: R is a hydrocarbon radical of 8 - 22 carbon atoms; $m$ is an integer of 1 to 6, $x$ is zero or 1; R' is H or methyl; and Z' is COOM, SO$_3$M or PO(OM)$_2$ — where M is H or an alkali metal.

In particular, those compounds in which R is mixed alkyl having 12 and 14 carbon atoms, and $m$ has an average value of 3 are most preferred.

Following is a description of the preparation of some of the preferred compounds of the class described, and their use in test apparatus that was designed for measuring the ability of the additive to inhibit corrosion and scale in typical circulating water systems.

EXAMPLE 1

An ethoxylated fatty alcohol, $R—(OCH_2CH_2)_m OH$ (where R = alkyl of $C_{12}$ and $C_{14}$, and $m$ = 3 average) is cyanoethylated with an excess of acrylonitrile (molar ratio of acrylonitrile to alcohol, 1.5–2.0). Potassium tertiary butoxide is used as the catalyst. The reaction is carried out at 25° – 30° C. for 3 – 4 hours. As the reaction is exothermic, a practical procedure is slowly adding acrylonitrile to the alcohol, with the catalyst dissolved in it, with stirring and cooling.

The cyanoethylated product is hydrolyzed with sulfuric acid monohydrate (molar ratio $H_2SO_4.H_2O/CN$ about 1.1) at 100°–110° C. for about 1 hour, followed by further heating with additional water (molar ratio $H_2O/CN$ about 10) at the same temperature for 2 hours. The product is then filtered while hot and allowed to separate into two layers. The upper layer consists mainly of the desired product, $R(OCH_2 CH_2)_m O(CH_2)CH_2COOH$. Analysis for its COOH content indicates a purity of about 95% (Product A).

EXAMPLE 2

To a round-bottom flask equipped with a stirrer and a thermometer are added 164.4 parts (0.5 mole) of an alcohol of the chemical composition, $R—(OCH_2CH_2)_mOH$, where R is mixed alkyl of $C_{12}$ and $C_{14}$, and $m$ has an average value of 3. To the flask, 41.1 parts of 97.5% NaOH (1.0 mole) are added with stirring. The mixture is heated for 2 hours at a temperature of about 60° F. To this mixture, 47.3 parts (0.5 mole) of chloroacetic acid are slowly added. The reaction is exothermic. The reaction mass was heated for 2 hours at 105° C., and for another 2 hours at 125° C. After cooling, the reaction product is filtered. The filtered product is mainly of the composition, $R(OCH_2CH_2)_nO\ CH_2COONa$. (Product B).

EXAMPLE 3

To a round-bottom flask equipped with a stirrer, a thermometer, and a Dean-Stark trap were added 0.55 moles of an alcohol of the chemical composition $R—(OCH_2CH_2)_mOH$ (where R is mixed alkyl of $C_{12}$ and $C_{14}$ and $m$ has an average value of 3). 1.65 Moles of powdered sodium hydroxide also was added to the flask. This mixture was heated to 80° C. and stirred for 2 hrs., until most of the NaOH appeared to be in solution. To this mixture was slowly added 0.55 moles chloromethyl phosphoric acid. The reactants were heated for 2 hrs., from 95° to 120° C. During this time, all of the phosphoric acid went into solution and the viscosity increased. The reaction product (Product C) was a semi-solid mass of the anticipated composition, $R(OCH_2CH_2)—O(CH_2)PO(OH)_2$.

TESTS IN LABORATORY TEST APPARATUS

The corrosion tests are carried out in laboratory heat exchanger units designed and built for the test purpose. The heat exchanger has a single tube made of SAE 1010 mild steel and having ½ inch outside diameter. This tube is enclosed in a glass jacket equipped with inlet and outlet arms about 1 foot apart. The tube is steam-heated on the inside and cooled on the outside by recirculating water which is circulated from a reservoir through the jacket and then back to the reservoir for cooling. Water temperature in the reservoir is maintained at about 45° C. The steam supply to the tube is regulated to maintain a temperature rise of 1° C. from entry to exit of the cooling water in the jacket. The rate of flow of cooling water in the jacket is kept at about 3 linear feet per second. Pre-weighed coupons of SAE 1010 steel measuring 3 × ⅜ × 1/16 inches are immersed in the path of the recirculating water. The test is run continuously for one week, at the end of which the coupons are removed, cleaned by conventional procedure and reweighed. The rate of corrosion, calculated from the measured weight loss and the time for the test, is expressed in terms of mils per year (mpy). After each test, the heat exchanger tube is disassembled, examined, and the solids deposited on its surface are dried, removed and weighed by a standard procedure. The weight of deposit removed, expressed directly in milligrams, indicates a comparative value of the actual formation of scale on the surface.

The cooling water used for each test is of controlled hardness and is made by adding weighed quantities of chemicals to deionized water. The characteristics of the cooling water are as follows:

| | |
|---|---|
| Total hardness, as ppm $CaCO_3$ | 550 |
| Ca hardness, as ppm $CaCO_3$ | 410 |
| Mg hardness, as ppm $CaCO_3$ | 140 |
| $SiO_2$, ppm | 35 |
| Methyl Orange alkalinity | 60 |
| Chloride, ppm | 300 |
| Sulfate, ppm | 200 |

Tests of compounds selected from the defined class of additives, in a use according to the invention, are carried out in the laboratory test apparatus as described above. In each test, a measured amount of the selected compound is added to the cooling water to make the concentration in ppm shown in Table I for the test. In some of the tests, a measured amount of a selected oil also is added to make the concentration shown in ppm of oil in the cooling water. When an oil is used, it preferably is mixed with the alkyl polyethoxy compound, in the relative portions to be used for the test, before the mixture is added to the water. This premixing procedure is followed for all of the examples described in Table I in which an oil was used. Such pre-mixing of the additive compound in the oil before addition is a preferred practice, but the component can be added separately to the circulating water if one wishes to do so. To illustrate improvements that are obtained by the invention, control tests are included, which do not embody the invention, and these tests are also recorded in Table I as a basis for comparison. Several light hydrocarbon oils of various types can be utilized; such as Exxon's Coray 37, Isopar M, Mentor 28, and Witco's Fractol A. They are described by the tradenames under which they are readily obtainable. All of these are light mineral oil petroleum fractions. Other oils, such as other dispersable hydrocarbon oils or vegetable oils, would be suitable. Also, a substituted hydrocarbon may be utilized instead of oil. Such substituted hydrocarbon can be described as R—X, where R is a hydrocarbon radical of 10 – 25 carbon atoms, and X is OH or Cl. In addition, it may be preferable to further include a surfactant with the oil and the additive compound. Such a surfactant is exemplified by Surfonic N-95, a nonionic adduct of nonylphenol with ethylene oxide. Other suitable dispersants that can be used with the oil include other ethylene oxide adducts of fatty acids or of alkylphenols or of polyamines, or the like. Nonionic surfactants are preferred. In most instances, the oil will be adequately dispersed by the inhibitor additive of the invention without need for a surfactant as dispersing agent.

TABLE I

| | ADDITIVES (CONC. ppm Cooling Water) | | | TEST RESULTS | |
|---|---|---|---|---|---|
| Test No. | Product from the Preparation Indicated (ppm) | Oil ppm (Tradename) | pH | Corrosion Rate mpy | Deposit mg |
| Control 1 | None | None | 7.2 | 70 | 5000 |
| Control 2 | None | (Coray 37) 50 | 7.2 | 60 | 4000 |
| Test 3 | A, 100 | None | 7.2 | 2.9 | 9 |
| Test 4 | A, 200 | None | 7.2 | 2.1 | 2 |
| Test 5 | A, 45 | (Coray 37) 50 | 7.2 | 3.0 | 6 |
| Test 6 | A, 35 | (Coray 37) 70 | 7.8 | 1.2 | 23 |
| Test 7 | A, 25 | (Coray 37) 50 | 7.2 | 1.4 | 30 |
| Test 8 | B, 100 | None | 7.2 | 2.1 | 75 |
| Test 9 | B, 75 | (Coray 37) 75 | 7.2 | 1.2 | 15 |
| Test 10 | C, 100 | 50 | — | 1.8 | 51 |

In the examples, the optimum concentration of the preferred additives were used, but the invention contemplates the use of any of the defined class of additives in any concentration which will effectively reduce corrosion and scale in metal parts of a system. Such effective amounts usually will fall in the range from about 10 ppm to about 200 ppm.

The mixtures of the additive compounds in oil for simultaneous addition to the circulating water are conveniently prepared by simple mechanical mixing of the two components. If needed, there is added enough of a surfactant dispersing agent, such as Surfonic N-95, Surfonic N-150, or Tetronic 504 or the like, in the mixture to ensure dispersion of the oil into the water as the mixture is added to the circulating water system. The dispersing agent normally is not needed. When used, up to about 25 ppm of the disperant in the circulating water will usually be sufficient for the purpose.

Waters treated with additives of the present invention may vary with respect to pH value within a wide range, e.g., waters having pH 6 – 9. For practical reasons it is most convenient and most economical to keep pH value of the circulating water in a range between pH 6.5 and 8.5, and the additives of the invention are effective in waters having any pH value in the ranges described.

The corrosion and scale inhibiting agents described for use in the present invention can be used in combination with other additive chemicals and agents that are commonly used for water treatment. For example, they may be used in circulating water that also has been treated with dispersants such as polyacrylic acid, sodium polyacrylate, hydrolyzed polyacrylamide, nitrilo-tris-acetic acid, or with flocculants such as polyacrylamide, copolymers of acrylamide and acrylic acid, or with other treating agents such as sodium polyphosphate, amino-tris-(methylenephosphonic acid), 1-hydroxy ethylidene-1,1-diphosphonic acid phosphorylated polyols, and the like.

The compositions described for use as additives for inhibiting corrosion and scale are compatible with most of the common biocides, such as chlorine, methylene-bis-thiocyanate, tri-butyltin-oxide complex, and the like, which also are used for water treatment in circulating water systems. These new additives are also compatible with most of the corrosion inhibitors that are used in such systems to protect copper or copper alloys in the system, such as benzotriazole, 2-mercaptobenzothiazole, and the like. The invention contemplates the use of the new additives for corrosion and scale control in water systems that also may contain one or several other additives of different kinds which have been added for any of several other purposes.

While the invention has been particularly described with reference to preferred embodiments thereof, it will be understood by those skilled in the art that various other embodiments may be prepared without departing from the spirit and scope of the invention. For example, other compounds characterized by the generic formula that are expected to function favorably in inhibiting corrosion are:

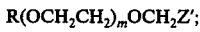

$R(OCH_2CH_2)_mOCH_2Z'$;

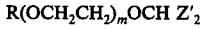

$R(OCH_2CH_2)_mOCH\ Z'_2$

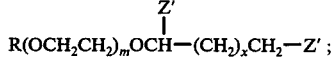

$R(OCH_2CH_2)_mOCH-(CH_2)_xCH_2-Z'$ ;

$R(OCH_2CH_2)_m\ OCH_2-NH_{2-y}(CH_2Z')_y$;

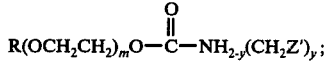

$R(OCH_2CH_2)_mO-\overset{O}{\overset{\|}{C}}-NH_{2-y}(CH_2Z')_y$ ;

$R(OCH_2CH_2)_mO_2C\!+\!CH(OH)\!\!\xrightarrow{}_x CH_2OCH_2PO(OH)_2$;

$R(OCH_2CH_2)_mO-\overset{NH_2}{\underset{|}{C}}-(PO(OM)_2)_2$ $R(OCH_2CH_2)_mO-\overset{OH}{\underset{|}{C}}-(PO(OM)_2)_2$;

and

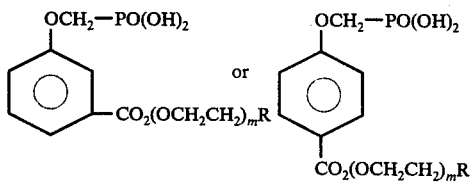

wherein:
R is a hydrocarbon radical of 8 – 22 carbon atoms
$m$ is an integer from 1 – 6
$x$ is zero or 1
$y$ is 1 or 2 and
Z is COOM, $SO_3M$ or $PO(OM)_2$ — where M is H or an alkali metal.

These compounds can be prepared by known reactions using standard laboratory procedures. The basic reactions involved are esterification of an acid with an alcohol, and the reaction of an alcohol with a chloroacid.

As described in Example 1, the subject corrosion inhibitors may be prepared by a process including the step of cyanoethylating an ethoxylated alcohol, R—

(OCH$_2$CH$_2$)$_m$OH, with acrylonitrile. At this point, the cyanoethylated product can be hydrolyzed to result in the final product, R(OCH$_2$CH$_2$)$_m$O(OC$_2$)CH$_2$COOH. However, the process may be modified by reacting the intermediate cyanoethylated product to form various other nitrile-derived compounds. For example, an imidazolyl product can be made via cyanoethylation of ethoxylated alcohol to form

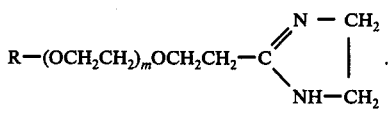

A guanamine,

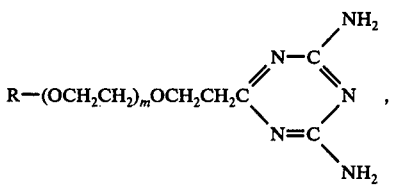

can be made by reacting the intermediate nitrile with dicyandiamide. The nitrile also can be reduced to form

Addition of H$_2$S to the nitrile intermediate produces

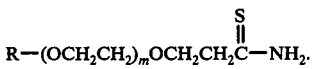

Addition of hydrazine to the nitrile results in

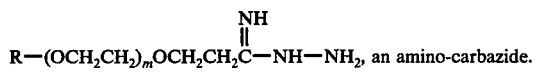

A cyanoamidine, 

is produced through addition of cyanamide to the nitrile. Trimerization of the nitrile intermediate product results in a triazine product characterized by the formula:

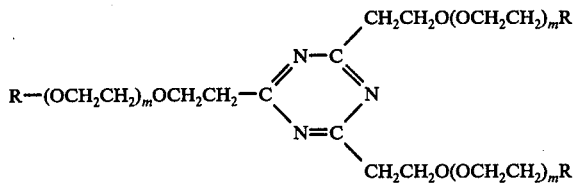

A potassium salt of hydroxamic acid product also can be made through reaction of the nitrile with hydroxylamine, NH$_2$OH, and an amide, ester or acid chloride to form

The compounds encompassed by the present invention feature the three moieties, as described, which function as an anchoring group, an oleophilic group, and a solubilizing group respectively. Modifications to other non-critical portions of the compounds may be effected without altering its functionability intended.

We claim:

1. A process for inhibiting corrosion and scaling on metal surfaces in water systems comprising: adding to water in said systems of from 10 to 200 ppm of additive selected from compounds having the general formula:

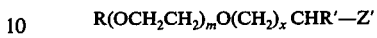

wherein:
R is a hydrocarbon radical of 8 – 22 atoms;
$m$ is an integer of 1 – 6;
$x$ is 0 or 1;
R' is Hydrogen or methyl; and
Z' is COOM, SO$_3$M or PO(OM)$_2$ — where M is H or an alkali metal.

2. The process defined by claim 1 including the addition of from 10 to 500 ppm of a selected oil dispersed in said water.

3. The process defined by claim 2 wherein said oil is a light oil petroleum fraction dispersed by means of a nonionic surfactant additive in said water.

4. The process defined by claim 1 wherein R is mixed alkyl hydrocarbon of 12 and 14 carbon atoms.

5. The process defined by claim 4 wherein $m$ equals an average value of 3.

6. The process defined by claim 1 wherein R is mixed alkyl hydrocarbon of 12 and 14 carbon atoms; $m$ equals an average of 3; $x$ = O; R' = Hydrogen; and Z' = COOH.

7. The process defined by claim 1, wherein: R is mixed alkyl hydrocarbon of 12 and 14 carbon atoms; $m$ has an average value of 3; $x$ = O, R' = H; and Z' is PO(OH)$_2$.

8. An additive composition for inhibiting corrosion and scale on metal parts of a water system, said composition consisting essentially of a polyethoxy compound having the general formula:

wherein:
R is a hydrocarbon radical of 8 – 22 carbon atoms;
$m$ is an integer of 1 – 6
$x$ is 0 or 1;
R' is Hydrogen or methyl; and
Z' is COOM, SO$_3$M or PO(OM)$_2$ — where M is H or an alkali metal; and a hydrocarbon oil that is dispersible in water with said polyethoxy compound.

9. The additive composition defined by claim 8 further comprising a non-ionic surfactant as dispersant for said oil.

10. The composition defined by claim 8 wherein R is mixed alkyl hydrocarbon of 12 and 14 carbon atoms, and $m$ has an average value of 3.

11. The composition defined by claim 8 wherein R is mixed alkyl hydrocarbon of 12 and 14 carbon atoms; $m$ = an average value of 3; $x = 1$; R' Hydrogen; and Z' = COOH.

12. The composition defined by claim 8 where R is mixed alkyl hydrocarbon of 12 and 14 carbon atoms; $m$ = an average value of 3; $x = O$; R' = Hydrogen; and Z' = COOH.

13. The composition defined by claim 8, wherein: R is mixed alkyl hydrocarbon of 12 and 14 carbon atoms; $m$ has an average value of 3; $x = O$; R' = H; and Z' is $PO(OH)_2$.

* * * * *